United States Patent
Yoon et al.

(10) Patent No.: US 9,275,304 B2
(45) Date of Patent: Mar. 1, 2016

(54) FEATURE VECTOR CLASSIFICATION DEVICE AND METHOD THEREOF

(75) Inventors: Sanghun Yoon, Daejeon (KR); Chun-Gi Lyuh, Daejeon (KR); Ik Jae Chun, Daejeon (KR); Jung Hee Suk, Daejeon (KR); Tae Moon Roh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 480 days.

(21) Appl. No.: 13/494,906

(22) Filed: Jun. 12, 2012

(65) Prior Publication Data

US 2013/0103620 A1    Apr. 25, 2013

(30) Foreign Application Priority Data

Oct. 19, 2011    (KR) .......................... 10-2011-0106863

(51) Int. Cl.
G06K 9/62    (2006.01)
G06N 99/00    (2010.01)

(52) U.S. Cl.
CPC ............ *G06K 9/6228* (2013.01); *G06K 9/6269* (2013.01); *G06N 99/005* (2013.01)

(58) Field of Classification Search
CPC .. G06K 9/6228; G06K 9/6269; G06N 99/005
See application file for complete search history.

(56) References Cited

U.S. PATENT DOCUMENTS

| | | | | |
|---|---|---|---|---|
| 6,249,781 B1* | 6/2001 | Sutton | ............................ | 706/25 |
| 6,327,581 B1* | 12/2001 | Platt | ................................. | 706/12 |
| 7,542,959 B2* | 6/2009 | Barnhill et al. | ................. | 706/48 |
| 8,095,483 B2* | 1/2012 | Weston et al. | .................. | 706/12 |
| 2005/0105794 A1* | 5/2005 | Fung | ............................. | 382/159 |
| 2008/0033899 A1* | 2/2008 | Barnhill et al. | ................. | 706/48 |

FOREIGN PATENT DOCUMENTS

KR    10-2006-0068541 A    6/2006

OTHER PUBLICATIONS

Simola, Alex J. et al.; "A tutorial on support vector regression"; 2004; Kluwer Academic Publishers; Statistics and Computing 14; pp. 199-222.*
Smola, Alex J. et al.; "A tutorial on support vector regression"; 2004; Kluwer Academic Publishers; Statistics and Computing14; pp. 199-22.*
Hsu, Chih-Wei et al.; "A Practical Guide to Support Ventor Classification"; 2010; Dept. of Computer Science, National Taiwan University; pp. 1-16.*
Kiri L. Wagstaff et al., "Progressive refinement for support vector machines", Data Min Knowl Disc 20, 2010, pp. 53-69, Springer.

\* cited by examiner

*Primary Examiner* — Alan Chen

(57) ABSTRACT

Disclosed is a feature vector classification device which includes an initial condition setting unit; a variable calculating unit configured to receive a training vector and to calculate an error and a weight according to setting of the initial condition setting unit; a loop deciding unit configured to determine whether re-calculation is required, based on a comparison result between the calculated error and an error threshold; and a hyperplane generating unit configured to generate a hyperplane when an end signal is received from the loop deciding unit.

10 Claims, 6 Drawing Sheets

Fig. 5

|   | Parameters | Value |
|---|---|---|
| HOG | Cell size | 8x8 pixel |
|   | Block size | 2x2 cell(16x16 pixel) |
|   | Overlap | 1 cell size |
|   | Normalize | L2-Hys |
|   | Local vector dim | 36 |
|   | Descriptor dim | 36x7x15=3,780 |
| LBP | Radius | 1 |
|   | Maximum Transitions | 2 |
|   | # of samples | 8 |
|   | Block size | 16x16 |
|   | Normalize | L2-Hys |
|   | Local vector dim | 59 |
|   | Descriptor dim | 59x4x8=1,888 |

Fig. 6

|  |  | LSVM | AddBoost | Reduction |
|---|---|---|---|---|
| # of mul. per win. | HOG | 3,780 | 1,352 | 64.2% |
|  | HOG-LBP | 5,668 | 2,042 | 64.0% |

FEATURE VECTOR CLASSIFICATION DEVICE AND METHOD THEREOF

CROSS-REFERENCE TO RELATED APPLICATIONS

A claim for priority under 35 U.S.C. §119 is made to Korean Patent Application No. 10-2011-0106863 filed Oct. 19, 2011, in the Korean Intellectual Property Office, the entire contents of which are hereby incorporated by reference.

BACKGROUND

The inventive concepts described herein relate to a feature vector classification device and a method thereof.

Feature vector classification may be one of critical factors to determine performance and speed of the recognition technique. A support vector machine (hereinafter, referred to as SVM) may be one of manners used to classify and recognize objects using machinery, and may be widely used thanks to its excellent performance.

However, a larger number of support vectors may be stored through nonlinear kernel to express high complexity using the SVM. Also, complicated operations may be required between input vector and support vector. Much hardware for parallel processing may be required to process the complicated operations in real time. That is, it is difficult to realize embedded system.

The complexity of operations can be simplified by a method of reducing the number of support vectors. With the method, classification performance may be seriously lowered.

SUMMARY

One aspect of embodiments of the inventive concept is directed to provide a feature vector classification device which comprises an initial condition setting unit; a variable calculating unit configured to receive a training vector and to calculate an error and a weight according to setting of the initial condition setting unit; a loop deciding unit configured to determine whether re-calculation is required, based on a comparison result between the calculated error and an error threshold; and a hyperplane generating unit configured to generate a hyperplane when an end signal is received from the loop deciding unit.

In example embodiments, an error calculated by the variable calculating unit is a normalized mean square error.

In example embodiments, the variable calculating unit expands and calculates the training vector.

Another aspect of embodiments of the inventive concept is directed to provide a feature vector classification method comprising setting an initial condition; receiving a training vector; selecting features of the training vector one by one to calculate an error and a weight; determining an error, satisfying a specific condition, from among the calculated errors; and comparing the specific error value with an error threshold to judge whether or not to generate a hyperplane.

In example embodiments, the initial condition includes the error threshold and a minimum feature number of the training vector.

In example embodiments, comparing the specific error value with an error threshold to judge whether or not to generate a hyperplane comprises iteratively calculating an error and a weight when the specific error value is larger than the error threshold, iteratively calculating an error and a weight including increasing a feature number of the training vector to further select one feature of the training vector.

In example embodiments, comparing the specific error value with an error threshold to judge whether or not to generate a hyperplane comprises generating a hyperplane using the selected features and the calculated weight with respect to the specific error, when the specific error value is smaller than the error threshold.

In example embodiments, the error satisfying a specific condition is an error having a minimum value from among the calculated errors.

In example embodiments, the error is a normalized mean square error.

In example embodiments, the feature vector classification method further comprises setting a criticality upon setting of the error threshold.

In example embodiments, the feature vector classification method further comprises generating a comparison error using the minimum error, the error threshold being compared with the comparison error instead of the minimum error.

In example embodiments, the training vector is expanded and calculated.

In example embodiments, the error and the weight are calculated when a distribution of the training vector is a Gaussian distribution.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 5 is a table illustrating parameters used to measure the complexity of calculation using a HOG-LBP descriptor.

FIG. 6 is a table illustrating the number of multiplication operations when HOG and HOG-LBP descriptors are used according to parameters in FIG. 5.

DETAILED DESCRIPTION

Figure 1:
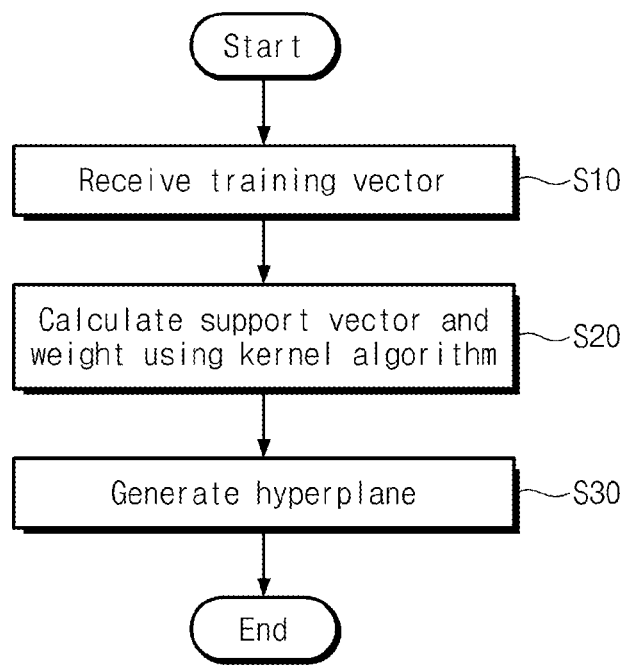
FIG. 1 is a flowchart illustrating a feature vector classifying method according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a flowchart illustrating a feature vector classifying method according to an embodiment of the inventive concept. A vector classifying method in FIG. 1 may be based on an SVM algorithm. The SVM may be based on structural risk minimization to classify feature vectors by a class unit.

Referring to FIG. 1, in operation S10, a training vector may be received to classify feature vector. Herein, the training vector may be a sample vector that is previously investigated to classify classes. A set X of N training vectors may be expressed by the following equation 1.

$$X=\{(x_1, y_1), (x_2, y_2) \ldots (x_N, y_N)\}, x_i \in R^- \quad (1)$$

In the equation 1, $x_i$ may indicate a training vector having d features. Each feature may be an element indicating a previously normalized feature to classify vectors, and $y_i$ may indicate a class of a training vector $x_i$.

In operation S20, a support vector and its weight may be selected from a training vector using a predetermined kernel algorithm. The support vector may be a vector for determining a hyperplane (or, a decision surface) selected between training vectors.

In operation S30, a hyperplane for classifying a feature vector may be generated using the support vector and the weight. Herein, the hyperplane may be a weighted combination formed of a sum of support vectors multiplied with the weight. Thus, it is necessary to calculate a support vector and a corresponding weight to make a hyperplane using the SVM. A process of generating the hyperplane to classify feature vectors may be referred to a training process.

A linear support vector machine (hereinafter, referred to as LSVM) may be the simplest kernel algorithm. The complexity of calculation on a training process using the LSVM may be proportional to the product of the number of support vectors and a support vector dimension. Thus, although a simple structure is used, the number of support vectors or the dimension must be reduced to shorten a time taken at a feature vector classification process. However, a decrease in the number of support vectors may cause a sharp decrease in the accuracy of a hyperplane function. Another embodiment of the inventive concept may be related to propose an algorithm in which the dimension of a training vector used to solve the above-described problem is minimized to reduce the complexity of calculation and the efficiency is simultaneously improved.

Figure 2:
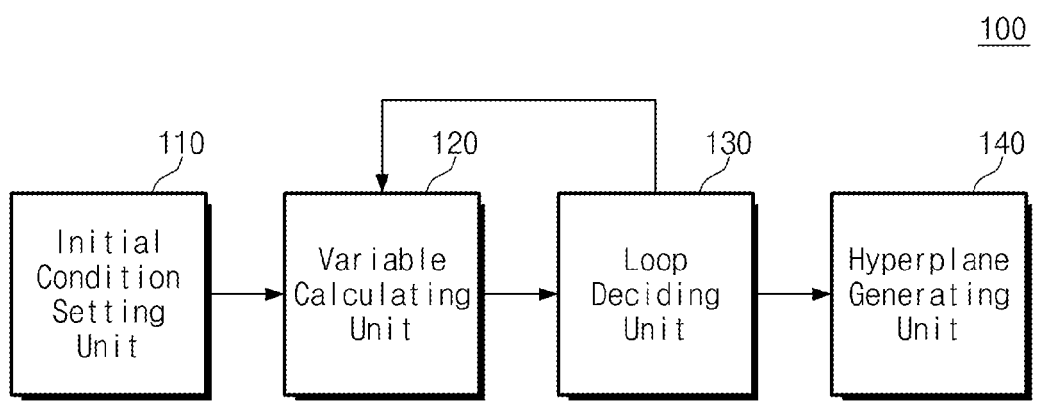
FIG. 2 is a conceptual diagram schematically illustrating a feature vector classification device according to another embodiment of the inventive concept.

FIG. 2 is a conceptual diagram schematically illustrating a feature vector classification device according to another embodiment of the inventive concept.

Referring to FIG. 2, a feature vector classification device according to another embodiment of the inventive concept may include an initial condition setting unit 110, a variable calculating unit 120, a loop deciding unit 130, and a hyperplane generating unit 140.

The initial condition setting unit 110 may be configured to set an initial condition of a training process. The initial condition setting unit 110 may set an error threshold, and may set an initial value k on number of features of training vector to be used for hyperplane generation. The initial condition setting unit 110 may also set an initial value of an error value t and a criticality $\chi$.

The error threshold may be a reference value for determining whether or not to generate the hyperplane after training is ended. The lower the error threshold, the higher the classification accuracy of the generated hyperplane. However, the lower the error threshold, the longer a time taken to calculate a training process.

The value k may be a dimension of a training vector to be used to generate the hyperplane. That is, the value k may indicate the number of features of a training vector to be used to generate the hyperplane. The larger the value k, the higher the complexity. On the other hand, the larger the value k, the higher the classification performance An initial value of the k may be set to '1' when it is not set by the initial condition setting unit 110.

The value t may be an error value, and may indicate the accuracy of judgment. The value t may be calculated through the mean square error. An initial value of the t may be set to '∞' when it is not set by the initial condition setting unit 110.

The value $\chi$ may be a constant for determining the criticality between a false positive probability and miss detect probability. A detection feature of the hyperplane may be adjusted by controlling the value $\chi$.

The variable calculating unit 120 may receive values set by the initial condition setting unit 110. The variable calculating unit 120 may receive a training vector. The variable calculating unit 120 may calculate a weight $\alpha$ on a training vector for hyperplane generation and a corresponding value t within the set values. The weight may be calculated such that the generated hyperplane has a minimum mean square error (hereinafter, referred to as MSE).

Upon selecting of (k−1) features, a weight on a training vector may be previously calculated with respect to the feature number k of the training vector used at a current loop. The variable calculating unit 120 may further select a new training vector feature (e.g., an mth feature). The variable calculating unit 120 may calculate values $\alpha$ and t respect to the selected k features. The variable calculating unit 120 may perform the above-described operation with respect to all selectable features.

In example embodiments, it is assumed that there are two vector classes: TRUE and FALSE. At this time, a TRUE vector and a FALSE vector may be distributed according to the Gaussian distribution. Herein, the TRUE vector may be such a vector that a class is TRUE, and the FALSE vector may be such a vector that a class is FALSE. The following equation 2 may indicate an error value t that is calculated to have a minimum MSE. However, the inventive concept is not limited thereto.

$$t = \frac{\frac{1}{N}\sum_{n=1}^{N_T}(f_{n,T} - f_T)^2 + \chi\frac{1}{N_F}\sum_{n=1}^{N_F}(f_{n,F} - f_F)^2}{(f_T - f_F)^2} \quad (2)$$

In the equation 2, an error value t may be calculated using a normalized MSE. The smaller the error value t, the higher the accuracy of judgment. Thus, it is necessary to set the error value t to a possible small value for improvement of classification efficiency of the hyperplane.

In the equation 2, $N_T$ may indicate the number of TRUE vectors. $N_F$ may indicate the number of FALSE vectors. $f_{N,T}$ may indicate a decision variable of an nth TRUE vector, and $f_{n,F}$ may indicate a decision variable of an nth FALSE vector. $f_T$ may be a mean value of decision variables of the TRUE vectors $f_{N,T}$. $f_F$ may be a mean value of decision variables of the FALSE vectors $f_{n,F}$. The decision variable may be used to judge whether a vector is TRUE or FALSE.

It is assumed that the variable calculating unit 120 further selects an mth feature of a training vector in addition to (k−1) features. $f_{n,T}^{(k)}$ may be a decision variable of an nth FALSE vector when the number of features of a training vector is k. $f_{n,F}^{(k)}$ may be a decision variable of an nth FALSE vector when the number of features of a training vector is k. The decision variables $f_{n,T}^{(k)}$ and $f_{n,F}^{(k)}$ may be calculated according to the following equation 3 with respect to decision variables $f_{n,T}^{(k-1)}$ and $f_{n,F}^{(k-1)}$ of a previous loop ((k−1) features).

$$f_{n,T}^{(k)} = f_{n,T}^{(k-1)} + \alpha g_{n,m,T}, f_{n,F}^{(k)} = f_{n,F}^{(k-1)} + \alpha g_{n,m,F} \quad (3)$$

In the equation 3, $\alpha g_{n,m,T}$ may indicate a value of an mth feature of an nth TRUE vector, and $\alpha g_{n,m,F}$ may indicate a value of an mth feature of an nth FALSE vector. $\alpha$ may be a weight on an nth vector. When the number of features of a current training vector is k, $f_T$ and $f_F$ may be calculated according to the following equations 4, 5, and 6.

$$f_T^{(k)} = \frac{1}{N_T}\sum_{n=1}^{N_T} f_{n,T}^{(k)} = \frac{1}{N_T}\sum_{n=1}^{N_T}\left(f_{n,T}^{(k-1)} + \alpha g_{n,m,T}\right) = f_T^{(k-1)} + \alpha g_{m,T} \quad (4)$$

$$f_T^{(k)} = \frac{1}{N_F}\sum_{n=1}^{N_F} f_{n,F}^{(k)} = \frac{1}{N_F}\sum_{n=1}^{N_F}\left(f_{n,F}^{(k-1)} + \alpha g_{n,m,F}\right) = f_F^{(k-1)} + \alpha g_{m,F} \quad (5)$$

$$g_{m,T} = \frac{1}{N_T}\sum_{n=1}^{N_T} g_{n,m,T} \quad g_{m,F} = \sum_{n=1}^{N_F} g_{n,m,F} \quad (6)$$

In the equations 4, 5, and 6, $f_T^{(k)}$ may be a mean value of a decision variable of TRUE vectors $f_{n,T}^{(k)}$ when the number of features of a current training vector is k. $f_F^{(k)}$ may be a mean value of a decision variable of FALSUE vectors $f_{n,F}^{(k)}$ when the number of features of a current training vector is k.

Thus, an error value t and a weight value $\alpha$ on a hyperplane decided by an added feature may be expressed by the following equations 7 and 8.

$$t = \frac{\frac{1}{N_T}\sum_{n=1}^{N_T}(f_{n,T}^k - f_T^k)^2 + \chi\frac{1}{N_F}\sum_{n=1}^{N_F}(f_{n,f}^k - f_F^k)^2}{(f_T^k - f_F^k)^2} \quad (7)$$

$$= \frac{a\alpha^2 + 2b\alpha + c}{(q\alpha + s)^2}$$

$$\alpha = \frac{(bs - cq)}{(as - bq)} \quad (8)$$

In the equations 7 and 8, a, b, c, q, and s may be variables defined for ease of calculation, and may be expressed by the following equations 9 to 13, respectively.

$$a = \frac{1}{N_T}\sum_{n=1}^{N_T} H_{m,T}^2 + \chi\frac{1}{N_F}\sum_{n=1}^{N_F} H_{m,F}^2 \quad (9)$$

$$b = \frac{1}{N_T}\sum_{n=1}^{N_T}\left(G_{m,T}^{(k-1)} H_{m,T}\right) + \chi\frac{1}{N_F}\sum_{n=1}^{N_F}\left(G_{m,F}^{(k-1)} H_{m,F}\right) \quad (10)$$

$$c = \frac{1}{N_T}\sum_{n=1}^{N_T} G_{m,T}^{(k-1)2} + \chi\frac{1}{N_F}\sum_{n=1}^{N_F} G_{m,F}^{(k-1)2} \quad (11)$$

$$q = H_{m,d} = g_{m,T} - g_{m,F} \quad (12)$$

$$s = G_d^{(k-1)} = f_T^{(k-1)} - f_F^{(k-1)} \quad (13)$$

In the equations 9 to 13, $H_{m,T}$, $H_{m,F}$, $G_{m,T}^{(k-1)}$, and $G_{m,F}^{(k-1)}$ may be expressed by the following equations 14 to 17.

$$H_{m,T} = g_{n,m,T} - g_{m,T} \quad (14)$$

$$H_{m,F} = g_{n,m,F} - g_{m,F} \quad (15)$$

$$G_{m,T}^{(k-1)} = f_{n,T}^{(k-1)} - f_T^{(k-1)} \quad (16)$$

$$G_{m,F}^{(k-1)} = f_{n,F}^{(k-1)} - f_F^{(k-1)} \quad (17)$$

The variable calculating unit 120 may calculate an error value t and a corresponding weight α when a feature is added with respect to a feature of a training vector that is not selected previously. The variable calculating unit 120 may judge a minimum error $t_{min}$ having a minimum value from among calculated error values t, and may judge a feature m and a weight $\alpha_m$.

The loop deciding unit 130 may compare the minimum error $t_{min}$ with a designated error threshold. When the minimum error $t_{min}$ is larger than the designated error threshold, the loop deciding unit 130 may provide the variable calculating unit 120 with a command for increasing a feature number k of a predetermined training vector. In connection with the changed value k, the variable calculating unit 120 may repeat the above-described calculation of values α and t in response to the command from the loop deciding unit 130.

If the minimum error $t_{min}$ is smaller than the error threshold, the loop deciding unit 130 may provide the hyperplane generating unit 140 with the calculated weight a on the selected feature. The hyperplane generating unit 140 may generate a hyperplane using the provided information, and a training process may be ended.

It is difficult to judge whether an error value converges on a desired result, based on a comparison result between the minimum error $t_{min}$ and the error threshold. Thus, the loop deciding unit 130 may calculate a comparison error $t_d$ instead of the minimum error. The comparison error $t_d$ may be a difference between the minimum error $t_{min}$ and a minimum error t_prev of a previous loop (when a feature number of a training vector is (k−1)). The loop deciding unit 130 may compare the comparison error $t_d$ with the error threshold to judge whether an error value converges on a desired result. Thus, it is possible to obtain a stable result.

Thus, the feature vector classification device 100 of the inventive concept may be configured to increase a feature number of a training vector to be used to generate a hyperplane one by one until a desired accuracy is obtained. At this time, a feature may be added such that a minimum error gradually increases. As a result, the feature vector classification device 100 of the inventive concept may provide a hyperplane with low complexity and high accuracy through a minimum training vector dimension.

Also, when a training vector dimension (i.e., a feature number of a training vector to be used) is reduced, a calculation time may be shortened, while the performance is lowered compared with SVM. For this reason, there may be required a method for compensating for the above-described drawback. When a training vector is provided to a variable calculating unit 120, it may be expanded and used without using of an original training vector. Thus, the performance may be improved. For example, when an original training vector is [(x)], it may be expanded into [(x), (x)2, (x)3, e(x), etc.].

Figure 3:
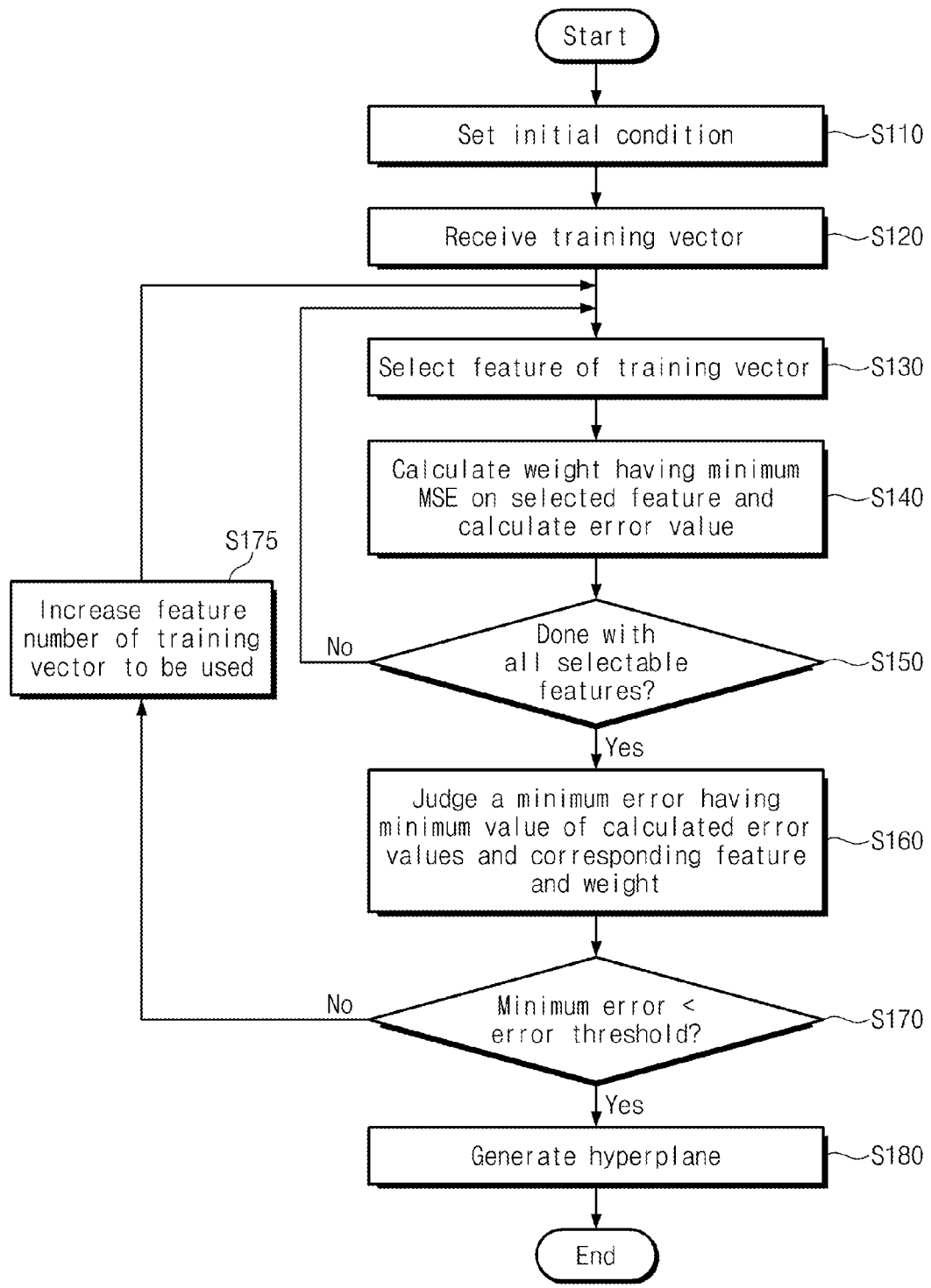
FIG. 3 is a flowchart illustrating a feature vector classification method according to an embodiment of the inventive concept.

FIG. 3 is a flowchart illustrating a feature vector classification method according to an embodiment of the inventive concept. In operation S110, an initial condition of a training process may be set. The initial condition may include an error threshold th, a feature number k of a training vector to be used, and an error t. A criticality χ can be included in the initial condition.

In operation S120, a training vector may be received to generate a hyperplane. At this time, the training vector can be expanded over a previously set value.

When a feature number of a training vector to be used is (k−1), a weight and an error may be calculated in advance. In operation S130, a feature may be selected under the condition that a feature (e.g., an mth feature) is added. In operation S140, a weight having a minimum MSE on the selected features and a corresponding error may be calculated as described above. In operation S150, there may be judged whether the above-described operation is performed with respect to all features of a training vector that is not selected in advance.

Then, an error value, having the smallest value, from among the calculated error values may be selected (minimum error $t_{min}$). A feature and a weight corresponding to the minimum error may be judged in operation S160.

In operation S170, the minimum error may be compared with a predetermined error threshold. When the error threshold is smaller than the minimum error, the method proceeds to operation S175, in which a value k increases by one. Afterwards, the method proceeds to operation S130.

When the error threshold is larger than the minimum error, the method proceeds to operation S180, in which whether a desired condition is achieved is judged and a hyperplane is generated using the calculated weight.

Figure 4:
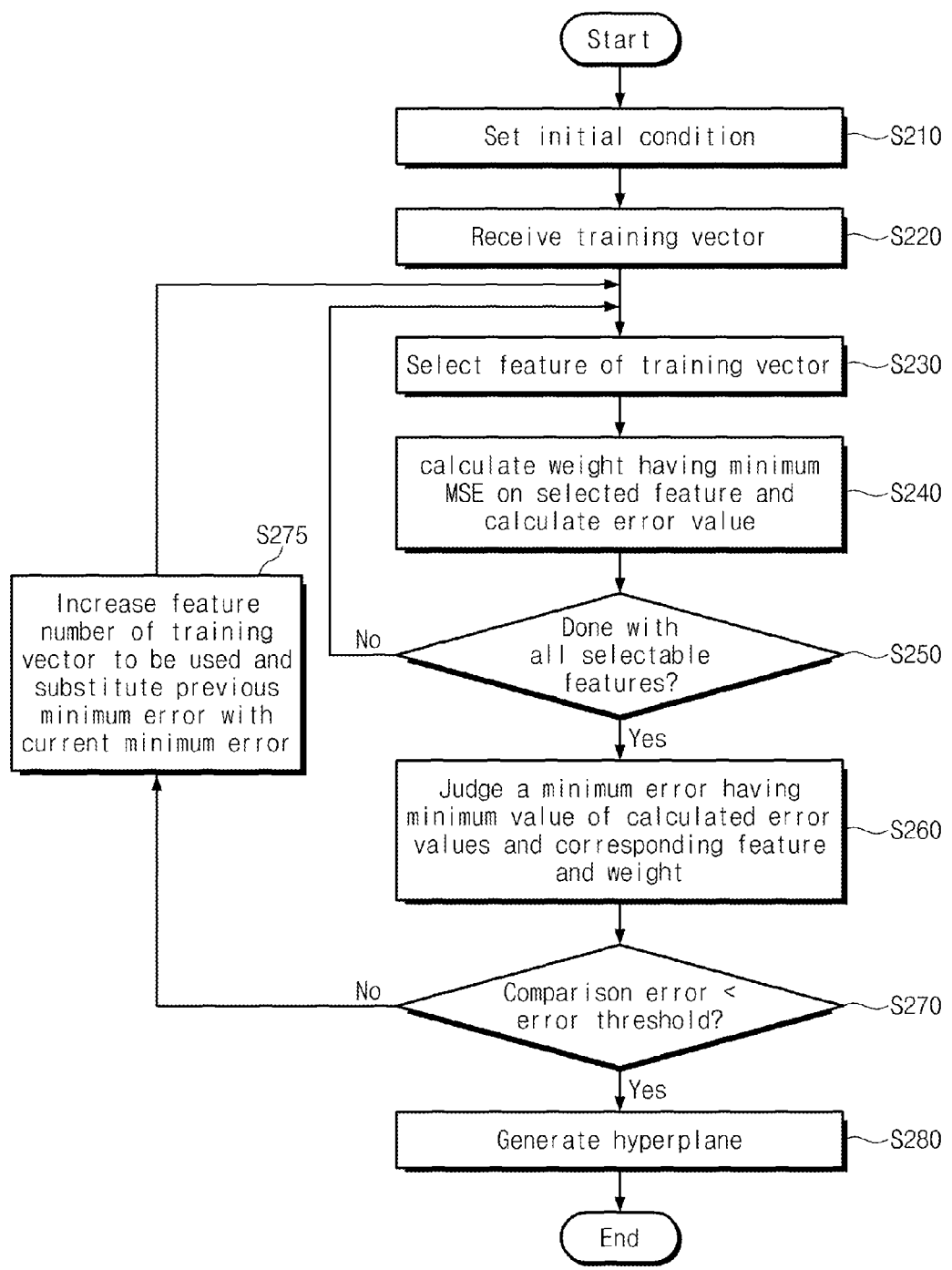
FIG. 4 is a flowchart illustrating a feature vector classification method according to another embodiment of the inventive concept.

FIG. 4 is a flowchart illustrating a feature vector classification method according to another embodiment of the inventive concept. A feature vector classification method in FIG. 4 may be similar to that in FIG. 3 except that a comparison error is used instead of a minimum error, and similar operations are thus marked by similar reference numerals. As described above, the accuracy of a feature vector classification method may be improved by calculating a comparison error instead of a minimum error. Operation S210 may further include setting an initial value of a previous minimum error t_prev. Also, in operation S270, a comparison error may be calculated instead of a minimum error, and a calculated result may be compared with an error threshold. Also, operation S275 may further include substituting a current minimum error $t_{min}$ with the previous minimum error t_prev.

FIG. 5 is a table illustrating parameters used to measure the complexity of calculation using a HOG-LBP descriptor.

FIG. 6 is a table illustrating the number of multiplication operations when HOG and HOG-LBP descriptors are used according to parameters in FIG. 5. Herein, a manner according to the inventive concept may be referred to as AddBoost. Referring to FIG. 6, compared with a conventional LSVM manner, the number of operations performed according to a manner of the inventive concept may be reduced over about 64%.

Figure 7:
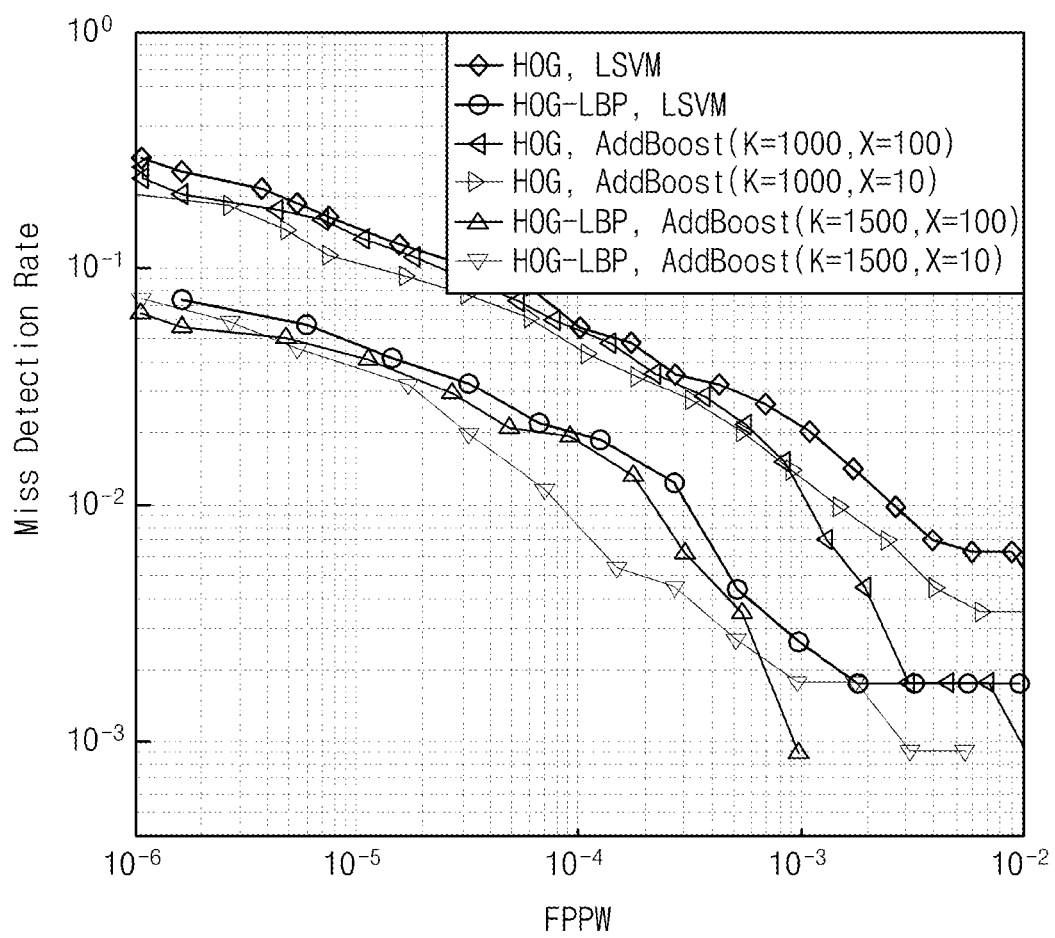
FIG. 7 is a diagram illustrating a simulation result of a miss detection rate on a false positive per window.

FIG. 7 is a diagram illustrating a simulation result of a miss detection rate on a false positive per window. In FIG. 7, K may indicate a feature number of a training vector, and X may indicate the number of training vectors. Referring to FIG. 7, compared with a conventional LSVM, a classification method of the inventive concept may show an excellent result with respect to both HOG-LBP and HOG.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A feature vector classification method comprising:
   receiving a training vector having a number k of features, k being a positive integer;
   selecting the features of the training vector one by one and calculating an error value and a weight for the selected feature of the training vector;
   determining an error value having a minimum value from among the calculated error values; and
   comparing the determined error value with an error threshold to judge whether or not to generate a hyperplane,
   wherein the training vector is a sample vector that is previously investigated to classify classes of feature vectors,
   wherein a feature is an element indicating a previously normalized feature to classify the classes of the feature vectors,
   wherein, when there are two vector classes of TRUE and FALSE, the error value is calculated based on decision variables of a TRUE vector and a FALSE vector, and
   wherein the weight is calculated from the training vector using a predetermined kernel algorithm.

2. The feature vector classification method of claim 1, wherein, if the determined error value having the minimum value is determined to be larger than the error threshold as a comparison result, the selecting step, the determining step, and the comparing step are repeated for a new feature of the training vector, the new feature being added by increasing the number k by 1.

3. The feature vector classification method of claim 1, further comprising generating the hyperplane using the selected feature corresponding to the determined error value and the calculated weight with respect to the determined error value if the determined error value is determined to be smaller than the error threshold.

4. The feature vector classification method of claim 1, further comprising:
   determining a criticality upon deciding of the error threshold.

5. The feature vector classification method of claim 4, wherein the TRUE vector and the FALSE vector are distributed according to a Gaussian distribution, the error value t is calculated as follows:

$$t = \frac{\frac{1}{N_T}\sum_{n=1}^{N_T}(f_{n,T}-f_T)^2 + \chi\frac{1}{N_F}\sum_{n=2}^{N_F}(f_{n,F}-f_F)^2}{(f_T-f_F)^2}$$

wherein $N_T$ indicates a number of TRUE vectors, $N_F$ indicates a number of FALSE vectors, $f_{n,t}$ indicates a decision variable of an nth TRUE vector, and $f_{n,F}$ indicates a decision variable of an nth FALSE vector, $f_T$ indicates a mean value of decision variables of the TRUE vectors $f_{n,T}$, $f_F$ indicates a mean value of decision variables of the FALSE vectors $f_{n,F}$, and a value $\chi$ represents the criticality.

6. The feature vector classification method of claim 5, wherein the decision variable of the nth TRUE vector when the number of features of the training vector is k is calculated as follows:

$$f_{n,T}^{(k)} = f_{n,T}^{(k-1)} + \alpha g_{n,m,T} f_{n,F}^{(k)} = f_{n,F}^{(k-1)} + \alpha g_{n,m,F}$$

wherein $f_{n,T}^{(k)}$ represents the decision variable of the nth TRUE vector, $f_{n,F}^{(k)}$ represents a decision variable of the nth FALSE vector when the number of features of the training vector is k, $f_{n,T}^{(k-1)}$ and $f_{n,F}^{(k-1)}$ represent decision variables of a previous loop in which the training vector has (k−1) features, $\alpha g_{n,m,T}$ indicates a value of an mth feature of the nth TRUE vector, and $\alpha g_{n,m,F}$ indicates a value of an mth feature of the nth FALSE vector, and $\alpha$ represents a weight on an nth vector.

7. The feature vector classification method of claim 6, wherein the weight $\alpha$ is calculated using the following equations:

$$\alpha = \frac{(bs-cq)}{(as-bq)}$$

$$a = \frac{1}{N_T}\sum_{n=1}^{N_T} H_{m,T}^2 + \chi\frac{1}{N_F}\sum_{n=1}^{N_F} H_{m,F}^2$$

$$b = \frac{1}{N_T}\sum_{n=1}^{N_T}\left(G_{m,T}^{(k-1)}H_{m,T}\right) + \chi\frac{1}{N_F}\sum_{n=1}^{N_F}\left(G_{m,F}^{(k-1)}H_{m,F}\right)$$

$$c = \frac{1}{N_T}\sum_{n=1}^{N_T} G_{m,T}^{(k-1)2} + \chi\frac{1}{N_F}\sum_{n=1}^{N_F} G_{m,F}^{(k-1)2}$$

$$q = H_{m,d} = g_{m,T} - g_{m,F}$$

$$s = G_d^{(k-1)} = f_T^{(k-1)} - f_F^{(k-1)}$$

$$H_{m,T} = g_{n,m,T} - g_{m,T}, H_{m,F} = g_{n,m,F} - g_{m,F}, G_{m,T}^{(k-1)} = f_{n,T}^{(k-1)} - f_T^{(k-1)},$$

and $$G_{m,F}^{(k-1)} = f_{n,F}^{(k-1)} - f_F^{(k-1)},$$

$$g_{m,T} = \frac{1}{N_T}\sum_{n=1}^{N_T} g_{n,m,T}$$

$$g_{m,F} = \frac{1}{N_F}\sum_{n=1}^{N_F} g_{n,m,F}.$$

8. The feature vector classification method of claim 1, further comprising:
   generating a comparison error value by calculating a difference between the determined error value having the minimum value and an error value obtained when the training vector has a (k−1) number of features, the error threshold being compared with the comparison error value instead of the determined error value.

9. The feature vector classification method of claim 1, further comprising expanding the training vector into a plurality of expanded training vectors,
   wherein the selecting step, the determining step, and the comparing step are performed using the expanded training vectors instead of the training vector.

10. The feature vector classification method of claim 1, wherein the error value and the weight are calculated when a distribution of the training vector is a Gaussian distribution.

* * * * *